(12) United States Patent
Ahn

(10) Patent No.: US 8,996,079 B2
(45) Date of Patent: Mar. 31, 2015

(54) PORTABLE TERMINAL WITH MULTIPLE-HINGES

(75) Inventor: Sung-Ho Ahn, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1048 days.

(21) Appl. No.: 13/051,100

(22) Filed: Mar. 18, 2011

(65) Prior Publication Data

US 2012/0034955 A1    Feb. 9, 2012

(30) Foreign Application Priority Data

Aug. 6, 2010    (KR) .................. 10-2010-0075858

(51) Int. Cl.
*H04M 1/00*    (2006.01)
*H04M 1/02*    (2006.01)

(52) U.S. Cl.
CPC ........ *H04M 1/0212* (2013.01); *H04M 2250/16* (2013.01)
USPC ....................................... 455/575.3; 455/566

(58) Field of Classification Search
CPC ............ H04M 1/0212; H04M 1/0227; H04M 1/0216; H04M 1/0233; H04M 1/0214; H04M 1/0222; H04M 1/0243; H04M 2250/16; G06F 1/1681; G06F 1/1677; E05D 11/1078
USPC ...................................................... 455/575.3
See application file for complete search history.

(56) References Cited

U.S. PATENT DOCUMENTS

| 6,292,980 | B1 * | 9/2001 | Yi et al. ........................... 16/303 |
| 7,155,266 | B2 * | 12/2006 | Stefansen .................. 455/575.3 |
| 7,561,421 | B2 * | 7/2009 | Rehn et al. ............... 361/679.09 |
| 2004/0061999 | A1 * | 4/2004 | Takemoto et al. ............ 361/683 |
| 2004/0141287 | A1 * | 7/2004 | Kim et al. ...................... 361/683 |
| 2004/0200038 | A1 * | 10/2004 | Kim ................................. 16/367 |
| 2005/0176478 | A1 * | 8/2005 | Terada ........................ 455/575.3 |
| 2006/0183369 | A1 * | 8/2006 | Park .............................. 439/517 |
| 2007/0123319 | A1 * | 5/2007 | Hwang ....................... 455/575.1 |
| 2007/0149260 | A1 * | 6/2007 | Satoh et al. ................ 455/575.1 |

FOREIGN PATENT DOCUMENTS

KR    10-0296038    7/2001    ............... H04B 1/40

* cited by examiner

*Primary Examiner* — Lester Kincaid
*Assistant Examiner* — Gary Lafontant
(74) *Attorney, Agent, or Firm* — Cha & Reiter, LLC.

(57) ABSTRACT

A portable terminal with multiple hinges including a first housing and a second housing foldably coupled to the first housing. The portable terminal includes a pair of side hinge arms formed to protrude from a first surface of the second housing, a hinge apparatus installed between the side hinge arms to couple the first housing and the second housing such that the first housing and the second housing pivot in a direction toward or away from each other while facing each other, and a display device installed on a second surface opposite to the first surface of the second housing, in which when the first housing and the second housing are unfolded, the first housing pivots in a direction such that the first surface and the second surface of the first housing are reversed to each other.

20 Claims, 13 Drawing Sheets

PORTABLE TERMINAL WITH MULTIPLE-HINGES

CLAIM OF PRIORITY

This application claims the benefit under 35 U.S.C. §119(a) from a Korean Patent Application filed in the Korean Intellectual Property Office on Aug. 6, 2010 and assigned Serial No. 10-2010-0075858, the entire disclosure of which is hereby incorporated by reference in its entirety.

BACKGROUND OF THE INVENTION

1. Field of the Invention

The present invention generally relates to a portable terminal and displays used in such devices. More particularly, the present invention relates to a portable terminal structured to maximize a size of a display device in a limited installation space.

2. Description of the Related Art

Generally, portable terminals can be classified into bar-type portable terminals, flip-type portable terminals, and folder-type portable terminals.

The bar-type portable terminal, which tends to resemble a candy bar, has a single housing on which data input/output means, a transmitter, and a receiver are mounted. Since a keypad used as the data input/output device in the bar-type portable terminal is always exposed to the exterior, the constant exposure may result in a malfunction. Further, there is a limitation in the miniaturization of the bar-type portable terminal because it is difficult to provide a sufficient distance between the transmitter and the receiver.

The flip-type portable terminal includes a body, a flip, and a hinge module connecting the flip to the body. The body of the flip-type portable terminal includes a data input/output unit, a transmitter, and a receiver mounted thereon. In the flip-type portable terminal, the flip when folded in a closed position can cover and thereby protect a keypad used as the data input/output unit, so as to prevent the malfunctioning of the keypad. However, there is an actual limitation in the miniaturization of the flip-type portable terminal because it is difficult to provide a sufficient distance between the transmitter and the receiver.

The folder-type portable terminal includes a body, a folder, and a hinge module connecting the folder to the portable terminal body. The folder rotates back and forth so as to be opened and closed. In a communication standby mode where the folder is in close contact with the portable terminal body, the portable terminal is prevented from malfunctioning. In a communication mode, the folder is unfolded so that a sufficient distance between the transmitter and the receiver is obtained. Thus, the folder-type portable terminal is advantageous to miniaturization. As such, mobile users recently have preferred folder-type portable terminals to any other type of portable terminals.

With the diversification of users' tastes, sliding-type portable terminals, swing-type portable terminals, and complex-type portable terminals performing folding and swing operations have also emerged, and portable terminals having the same appearance as folder-type portable terminals where a housing can rotate with respect to the other housing in a direction that front and rear surfaces are reversed have also emerged.

With the development of a mobile communication service focusing on voice communication and message transmission, portable terminals have become extremely popular, and as a result, services provided by the portable terminals have also become diversified. For example, users can download files or enjoy on-line games on-line through portable terminals, and download and play digital multimedia broadcasting, moving pictures, and music files. As such, multimedia functions of the portable terminals have also been emphasized. In addition, a banking service such as a credit card function using a Subscriber Identification Module (SIM) has come into wide use.

However, in spite of an emphasis on games or multimedia services, there is some limitation in enlarging the display device because of the adverse impact on the portability of the portable terminal. Accordingly, much effort has been made to secure a larger display device in a limited-size portable terminal.

SUMMARY OF THE INVENTION

Accordingly, an exemplary aspect of the present invention is to provide a portable terminal through which a user can conveniently use a multimedia function such as viewing a moving picture.

Moreover, another exemplary aspect of the present invention is to provide a portable terminal capable of easily securing an installation space for a display device in a housing of the portable terminal.

Furthermore, still another exemplary aspect of the present invention is to provide a portable terminal which couples a pair of housings to allow the housings to rotate around two hinge axes and easily secure an installation space for a display device.

According to an exemplary aspect of the present invention, there is provided a portable terminal preferably including a first housing and a second housing foldably coupled to the first housing. The portable terminal includes a pair of side hinge arms formed to protrude from a first surface of the second housing, a hinge apparatus installed between the side hinge arms to couple the first housing and the second housing such that the first housing and the second housing pivot in a direction toward or away from each other while facing each other, and a display device installed on a second surface opposite to the first surface of the second housing, in which when the first housing and the second housing are unfolded, the first housing pivots in a direction such that the first surface and the second surface of the first housing are reversed to each other.

The portable terminal may further preferably include another display device installed on the first surface of the second housing.

The portable terminal may further preferably include a keypad installed on a first surface or a second surface of the first housing. As a front surface and a rear surface of the first housing are reversed in unfolded states of the first housing and the second housing, the keypad may be selectively positioned in parallel with the display device.

The hinge apparatus may include a hinge housing coupled between the side hinge arms to rotate around a first hinge axis, a coupling shaft fixed to the hinge housing, the coupling shaft extending along a second hinge axis which is perpendicular to the first hinge axis, and a coupling member fixed to the first housing and coupled to the coupling shaft to rotate around the second hinge axis, in which as the hinge housing rotates, the second housing pivots around the first hinge axis to move in a direction toward or away from the first housing, and as the coupling member rotates, the front surface and the rear surface of the first housing are reversed.

The hinge apparatus may further preferably include a hinge module received in the hinge housing and engaged with any one of the side hinge arms, and the hinge module may provide a drive force urging the first housing to move toward or away from the second housing according to a position where the first housing pivots around the first hinge axis.

The hinge apparatus may further preferably include a cam member received in the hinge housing to reciprocate on the coupling shaft along the second hinge axis and an elastic (biasing) member received in the hinge housing to provide an elastic (bias) force urging the cam member to closely contact the coupling member.

The coupling shaft may be coupled to sequentially pass through the cam member and the coupling member, and an engaging member may be bound to an end portion of the coupling shaft to define the cam member and the coupling member on the coupling shaft.

The elastic member may be disposed on both sides of the coupling shaft or may be disposed to surround the coupling shaft.

The hinge apparatus may include a first male thread portion formed on the cam member and a second male thread portion formed on a surface of the coupling member to slide-contact the first male thread portion, and top end portions of the first male thread portion and the second male thread portion may be planar.

BRIEF DESCRIPTION OF THE DRAWINGS

The above and other exemplary aspects and advantages of an exemplary embodiment of the present invention will become more apparent from the following detailed description taken in conjunction with the accompanying drawings, in which.

DETAILED DESCRIPTION

Hereinafter, exemplary embodiments of the present invention will be described in detail with reference to the accompanying drawings. In the following description, well-known functions or constructions may not be described in detail to avoid obscuring appreciation of the present invention by a person of ordinary skill in the art with descriptions of such well-known functions or constructions.

Figure 1:
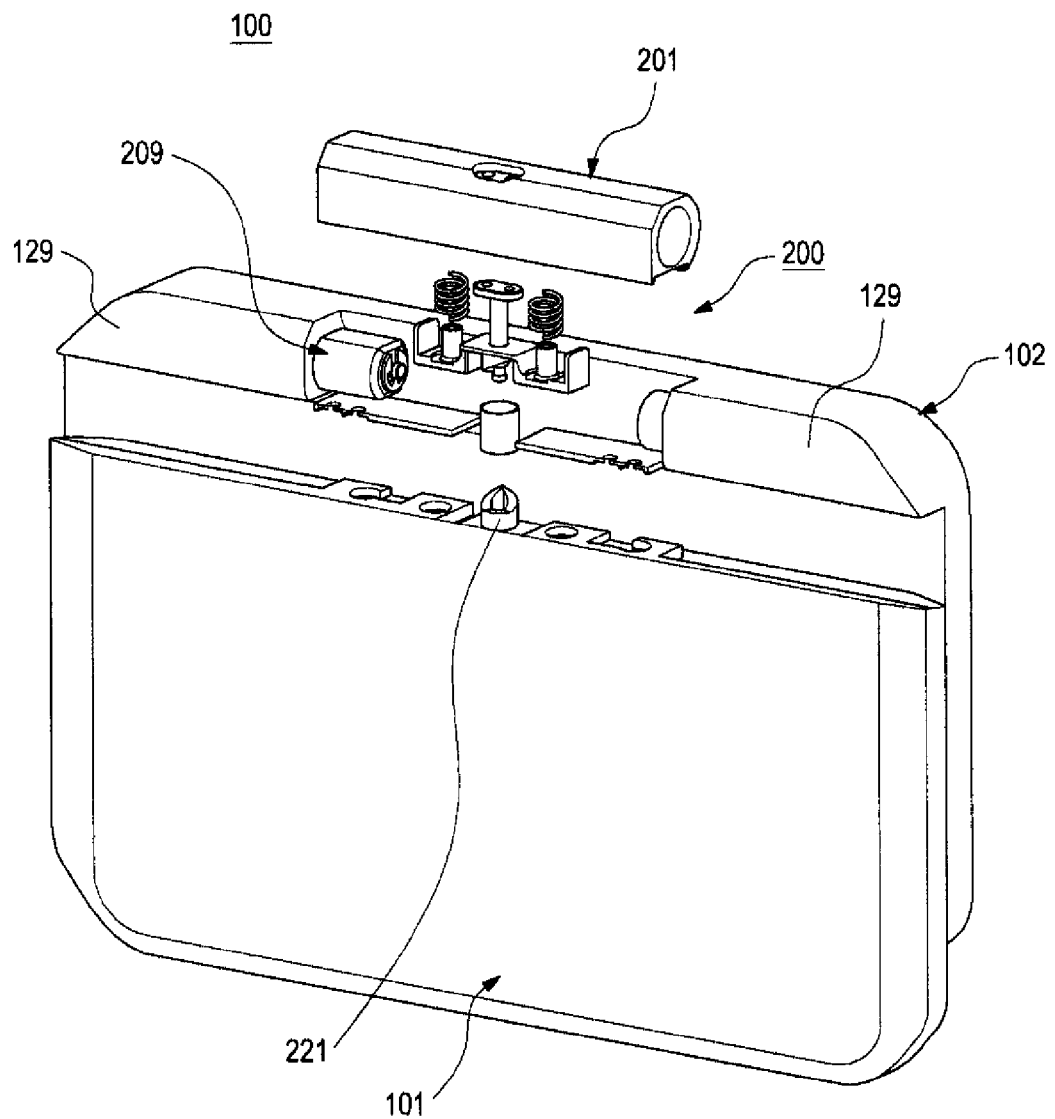
FIG. 1 is an exploded perspective view of a portable terminal according to an exemplary embodiment of the present invention.
Figure 14:
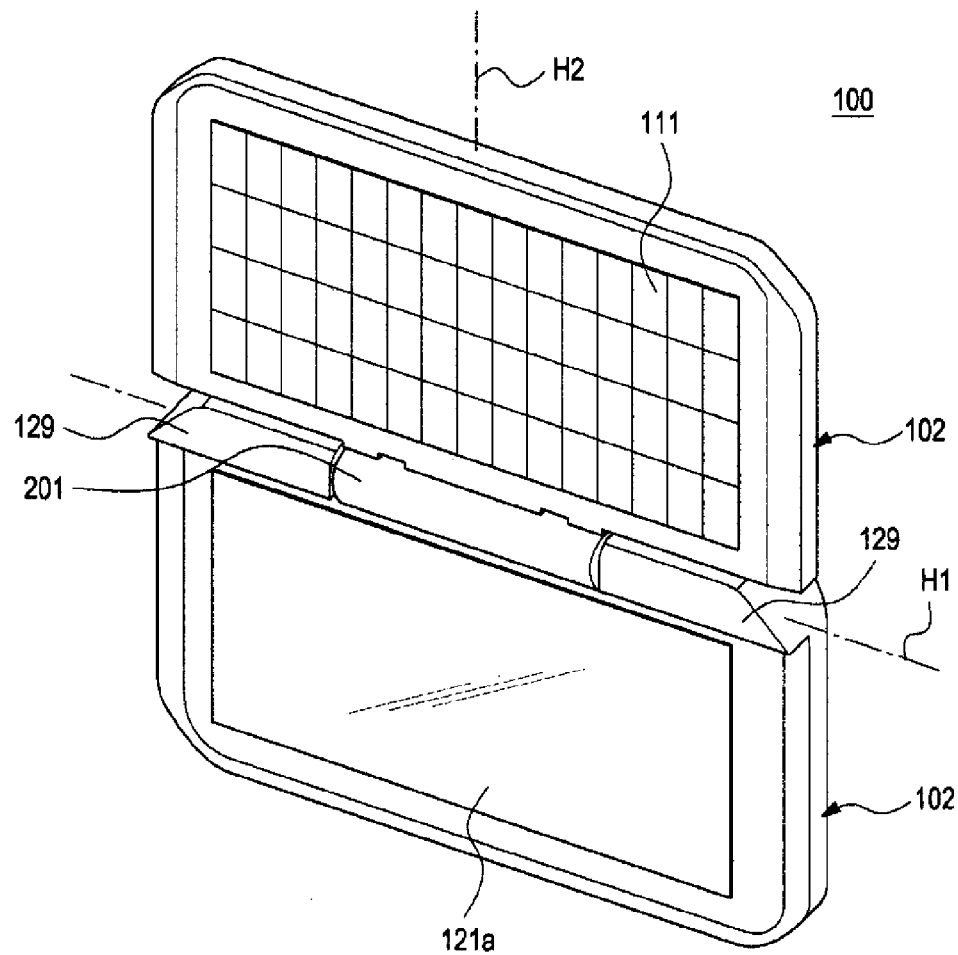
FIG. 14 is a perspective view showing a state where a second housing of a portable terminal shown in FIG. 1 is opened by pivoting.
Figure 15:
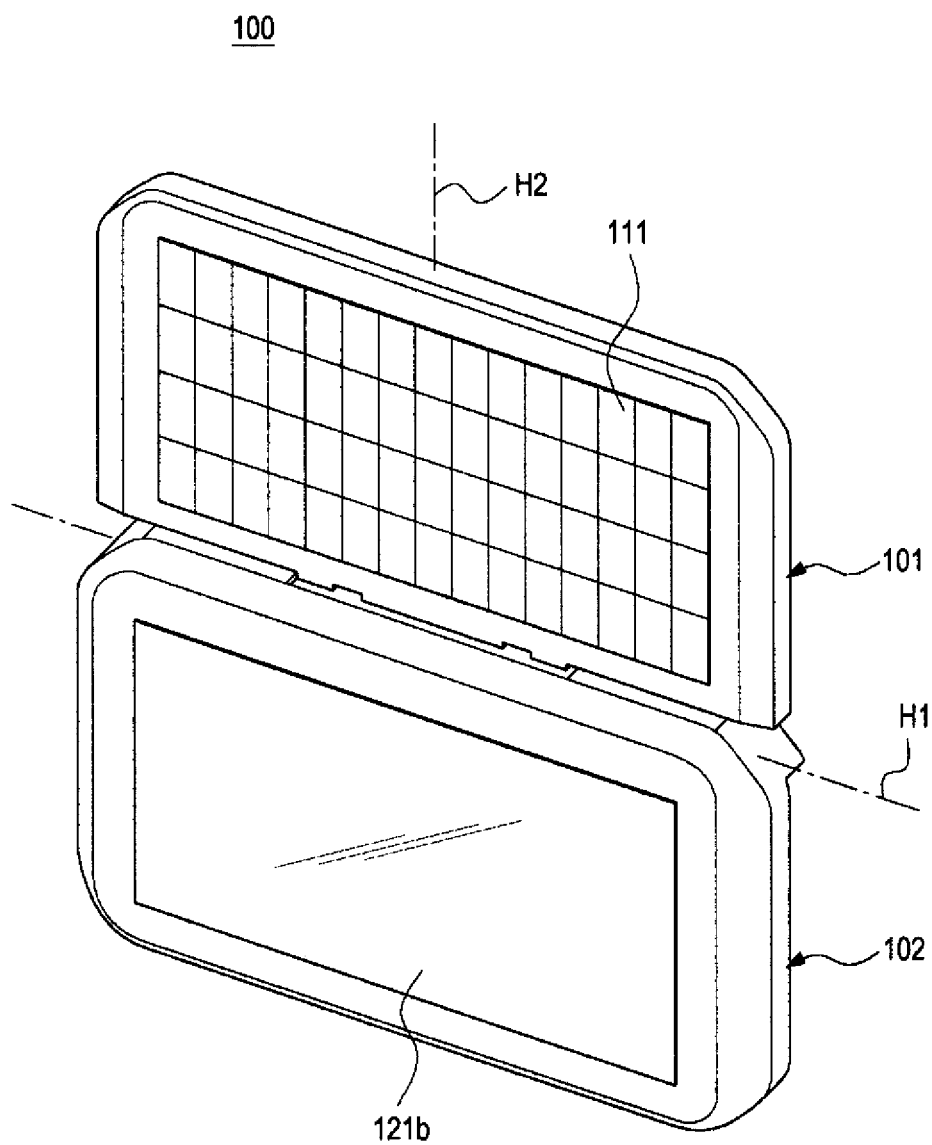
FIG. 15 is a perspective view showing a state where front and rear surfaces of a first housing shown in FIG. 14 are reversed.

Referring now to FIGS. 1, 14, and 15, a portable terminal 100 according to an exemplary embodiment of the present invention preferably includes a first housing 101, a second housing 102 which is coupled to the first housing 101 such that the second housing 102 is opened or closed by pivoting around a first hinge axis H1 (FIG. 14) in a direction towards or away from the first housing 101, and a hinge apparatus 200 which couples the first housing 101 with the second housing 102. The first housing 101, when being opened by pivoting away from the second housing 102, pivots around a second hinge axis H2 that is substantially perpendicular to the axis H1 such that front and rear surfaces thereof are reversed to each other. In other words, the hinge apparatus 200 provides a pair of hinge axes (H1 and H2) extending perpendicularly to each other, and in order for the first housing 101 to pivot around the second hinge axis H2, the first housing 101 has to be opened by pivoting away from the second housing 102.

The first housing 101 includes a keypad 111 installed on a surface thereof and a battery pack (not shown) mounted on another surface thereof. The battery pack may be hidden by using a separate cover. On a side of a surface of the second housing 102, that is, a side of a first surface of the second housing 101 to be described below are formed a pair of side hinge arms 129 between which the hinge apparatus 200, more specifically, a hinge housing 201 of the hinge apparatus 200 is coupled. The keypad 111 is selectively opened or closed as the second housing 102 pivots around the first hinge axis H1. The second housing 102 includes display devices 121a and 121b installed on the aforementioned first surface and a second surface opposite to the first surface, respectively. The display device 121a is installed on the first surface on which the side hinge arms 129 are installed and the display device 121b is installed on the second surface opposite to the first surface.

When the first housing 101 and the second housing 102 are folded together, the first housing 101 is positioned on the first surface of the second housing 102. When the first housing 101 and the second housing 102 are unfolded, the first housing 101 may pivot around the second hinge axis H2 such that front and rear surfaces of the first housing 101 may be reversed. Moreover, when the first housing 101 and the second housing 102 are folded together again, the keypad 111 may be hidden by facing the first surface of the second housing 102, or may be selectively exposed by being positioned against the first surface of the second housing 102. Since the first housing 101 can be folded to face the first surface of the second housing 102 even when its front and rear surfaces are reversed, a surface on which the keypad 111 is installed may be one of the front surface and the rear surface of the first housing 101.

When the first housing 101 and the second housing 102 are unfolded by pivoting away from each other, the keypad 111 may be positioned in parallel with the display device 121b by reversing the front and rear surfaces of the first housing 101 (see FIGS. 14 and 15). In this case, a user can conveniently create a document or enjoy a game by using the keypad 111. If the keypad 111 is a qwerty arrangement keyboard, the user can more conveniently create a document.

Figure 2:
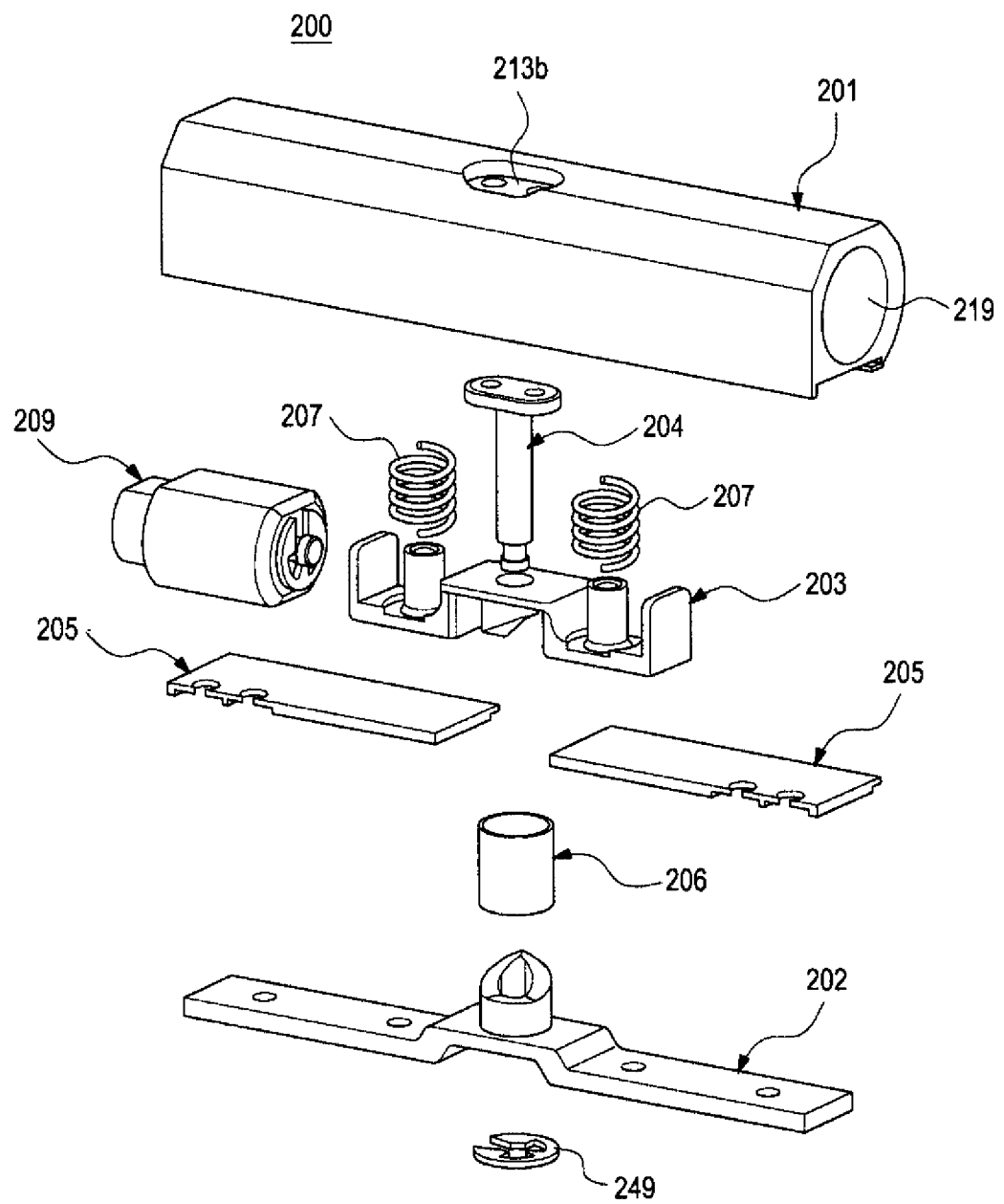
FIG. 2 is an exploded perspective view of a hinge apparatus of a portable terminal shown in FIG. 1.

Referring now to FIG. 2, the hinge apparatus 200 includes the hinge housing 201 which pivots around the first hinge axis H1 and a coupling member 202 which is fixed to the first housing 101 and is coupled to the hinge housing 201 to rotate around the second hinge axis H2. The coupling member 202 is coupled to the hinge housing 201 such that a surface thereof faces an outer circumferential surface of the hinge housing 201, and when the hinge housing 201 rotates around the first hinge axis H1, the coupling member 202 revolves around the first hinge axis H1.

Figure 3:
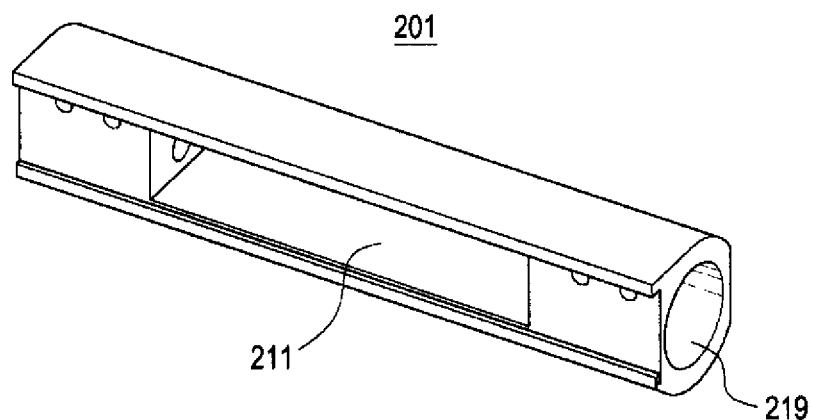
FIG. 3 is a perspective view of a hinge housing of a hinge apparatus shown in FIG. 2.
Figure 4:
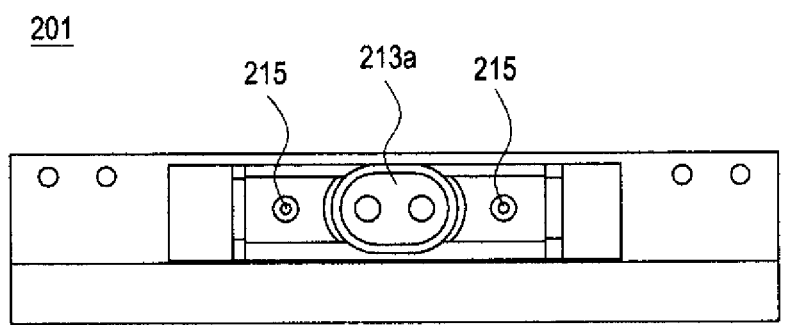
FIG. 4 is a plane view showing an internal structure of a hinge apparatus shown in FIG. 3.

Referring now to FIGS. 3 and 4, the hinge housing 201 is preferably comprised in a cylindrical shape extending along the first hinge axis H1, and both ends thereof are opened. The hinge housing 201 is configured such that a portion of the outer circumferential surface thereof is planar, a portion of which is cut to form an opening 211. On an inner wall exposed through the opening 211, that is, the inner wall seen when an inner side of the hinge housing 201 is viewed through the opening 211 along the second hinge axis H2, a resting surface 213a partially recessed is formed. On both sides of the resting surface 213a are formed a pair of second support protrusions 215 extending in parallel with the second hinge axis H2. The second support protrusions 215 support elastic members 207 together with first support protrusions 239 to be described below, and guides reciprocating movement of a cam member 203 while restricting rotation of the cam member 203.

An internal space of the hinge housing 201 may be perforated along the first hinge axis H1, and may have various shapes of partitions to improve structural strength. In addition, by forming a partition on the inner side of the hinge housing 201, the hinge housing 201 may be used as a support structure capable of stably installing a hinge module 209 to be described below or the cam member 203. Spaces 219 at both end portions of the hinge housing 201 provide a coupling so that the hinge module 209 is coupled and in which a hinge dummy (291 shown in FIG. 11) is coupled, respectively.

Figure 5:
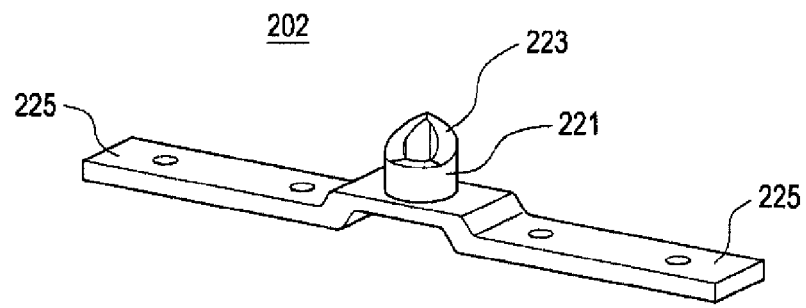
FIG. 5 is a perspective view of a coupling member of a hinge apparatus shown in FIG. 2.
Figure 6:
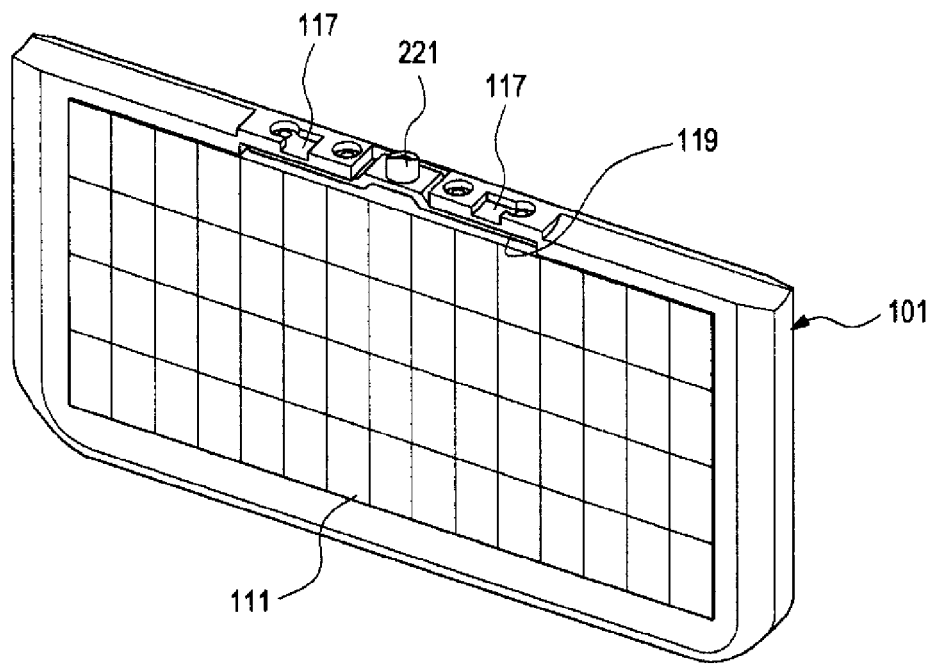
FIG. 6 is a perspective view showing a state where a coupling member shown in FIG. 5 is installed in a second housing of a portable terminal.

The coupling member 202 is shown in FIG. 5, and an installed state thereof in the first housing 101 is shown in FIG. 6. The coupling member 202 extends longitudinally in a direction and a portion thereof is in a curved shape, such that a second male thread portion 221 is formed on a surface of the curved portion. The second male thread portion 221 converts an elastic force of the elastic members 207 into a rotating force as an inclined surface 223 of the second male thread portion 221 sliding-contacts an inclined surface 233b of a first male thread portion 233a. The coupling member 202 is coupled to the first housing 101 through a slit 119 formed in a side end of the first housing 101 and is fixed thereto by a separate screw. The screw may be engaged to portions 225 extending from both sides of the second male thread portion 221.

Although the coupling member 202 preferably faces the outer circumferential surface of the hinge housing 201, the coupling member 202 is coupled to the slit 119 (FIG. 6) when the hinge apparatus 200 couples the first housing 101 with the second housing 102, such that a portion of the first housing 101 is interposed between the coupling member 202 and the hinge housing 201. Once the coupling member 202 is coupled to the first housing 101, the second male thread portion 221 protrudes from a side end of the first housing 101 and the second male thread portion 221, when coupled to the hinge housing 201, is positioned in the inner side of the hinge housing 201, as shown in FIG. 6.

Figure 7:
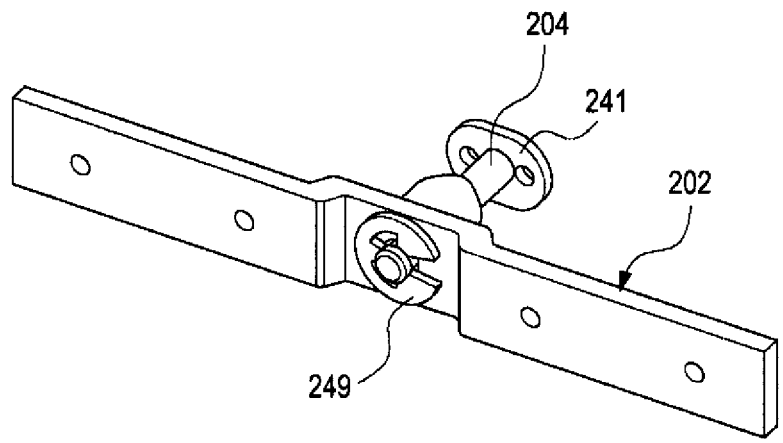
FIG. 7 is a perspective view showing a state where a coupling member shown in FIG. 2 is bound to a coupling shaft.

As shown in FIG. 7, in order to couple the coupling member 202 to the hinge housing 201, the hinge apparatus 200 includes a coupling shaft 204. The coupling shaft 204 extends along the second hinge axis H2 and includes a resting member 241 at an end thereof to be coupled to the resting surface 213a. To fix the coupling shaft 204 to the hinge housing 201, a screw (not shown) may be used and the screw is engaged from an outside of the hinge housing 201 to the resting member 241 on the resting surface 213a. The resting surface 213a and the resting member 241 are formed in polygonal shapes or oval shapes to facilitate setting of a coupling position of the coupling shaft 204.

To prevent a head portion of the screw for fixing the resting member 241 to the resting surface 213a from protruding to the outside of the hinge housing 201, a receiving recess 213b (FIG. 2) is formed on the outer circumferential surface of the hinge housing 201 and the receiving recess 213b is positioned to correspond to the resting surface 213a. Another end portion of the coupling shaft 204 protrudes from another surface of the coupling member 202 by passing through the coupling member 202, more specifically, the second male thread portion 221 along the second hinge axis H2, and an engaging member 249 is coupled to the protruding portion of the coupling shaft 204. An E-ring or a C-ring may be used as the engaging member 249, such that the coupling member 202 is bound to the hinge housing 201 through the coupling shaft 204.

Consequently, the hinge housing 201 is coupled between the side hinge arms 129 through the hinge module 209 or the hinge dummy 291 provided at both ends thereof, thus rotating around the first hinge axis H1, and the coupling member 202, while being fixed to the first housing 101, is coupled to the hinge housing 201, thus rotating around the second hinge axis H2. As the hinge housing 201 rotates around the first hinge axis H1, the first housing 101 and the second housing 102 pivot toward or away from each other. When the portable terminal 100 is open, the first housing 101 pivots around the second hinge axis H2, together with the coupling member 202, such that the front and rear surfaces of the first housing 101 are reversed.

Herein, the hinge module 209 may provide a drive force during pivoting of the second housing 102 around the first hinge axis H1, by using a hinge module disclosed in Korean Patent Registration No. 296,038 (U.S. Pat. No. 6,292,980, which is incorporated by herein as background material) granted to the present Applicant. Thus, the hinge module 209 will not be described in detail.

Figure 8:
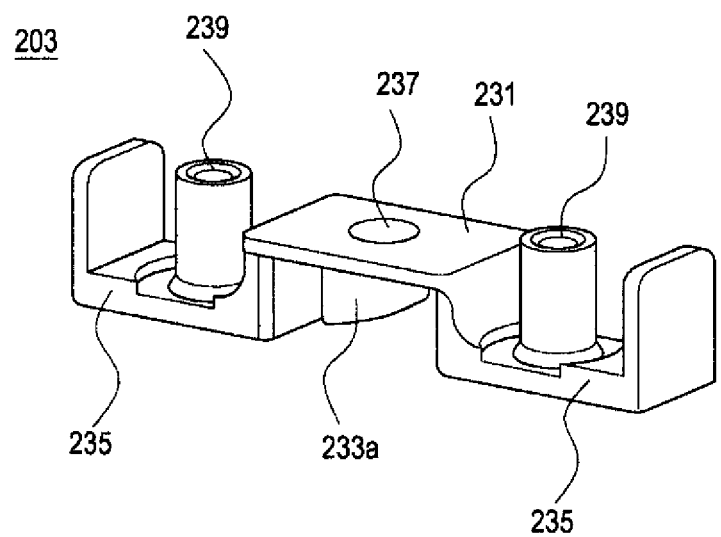
FIGS. 8 and 9 are perspective views showing a cam member of a hinge apparatus shown in FIG. 2.
Figure 9:
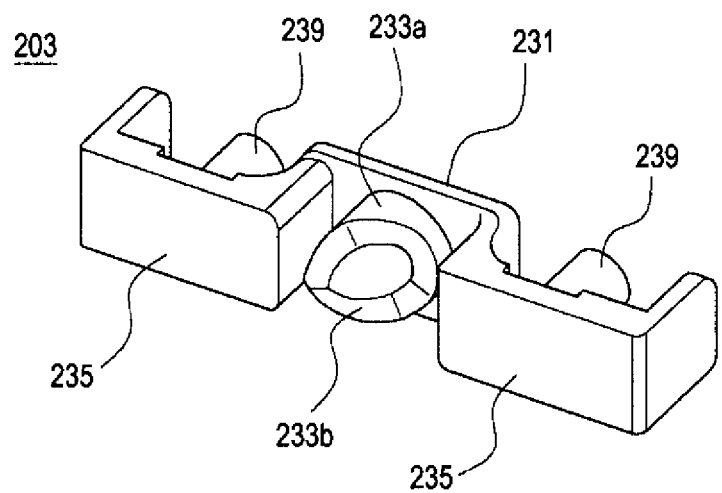
Figure 10:
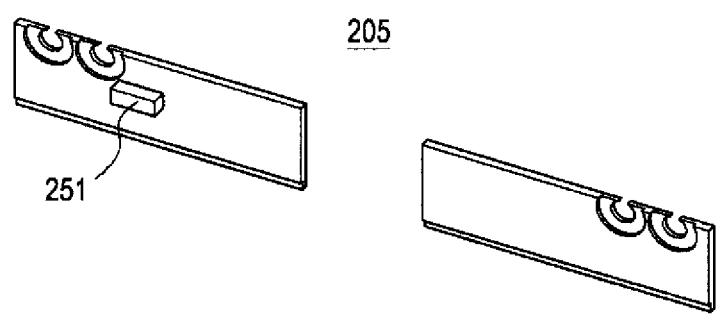
FIG. 10 is a perspective view of a cover member of a hinge apparatus shown in FIG. 2.

As shown in FIG. 8, the hinge apparatus 200 may preferably include the cam member 203 and the elastic members 207 to generate the drive force during pivoting of the second housing 102 around the second hinge axis H2. Moreover, the hinge apparatus 200 includes a cover member 205 to close the opening 211 of the hinge housing 201 in the completed hinge apparatus 200.

The foregoing structures will be described in more detail with reference to FIGS. 2 and 8 through 10.

The cam member 203 is assembled into the hinge housing 201 through the opening 211 of the hinge housing 201, and includes on a surface thereof a body 231 where the first male thread portion 233a is formed and supports 235 extending in a direction away from both sides of the body 231. The body 231 includes a through-hole 237 (FIG. 8) which passes through the second male thread portion 221 along the second hinge axis H2. The supports 235 include first support protrusions 239 extending in a direction facing the second male thread portion 221. Once the cam member 203 is coupled to the hinge housing 201, the second support protrusions 215 are inserted into the first support protrusions 239 to limit rotation of the cam member 203 and guide reciprocating movement of the cam member 203 along the hinge axis 112. When the cam member 203 is assembled into the hinge housing 201, the coupling shaft 204 passes through the through-hole 237, thus being coupled to the cam member 203.

A structure such as a partition can be formed in the hinge housing 201, and by cutting end portions of the supports 235 to interfere with structures in the hinge housing 201, rotation of the cam member 203 can be limited.

Figure 11:
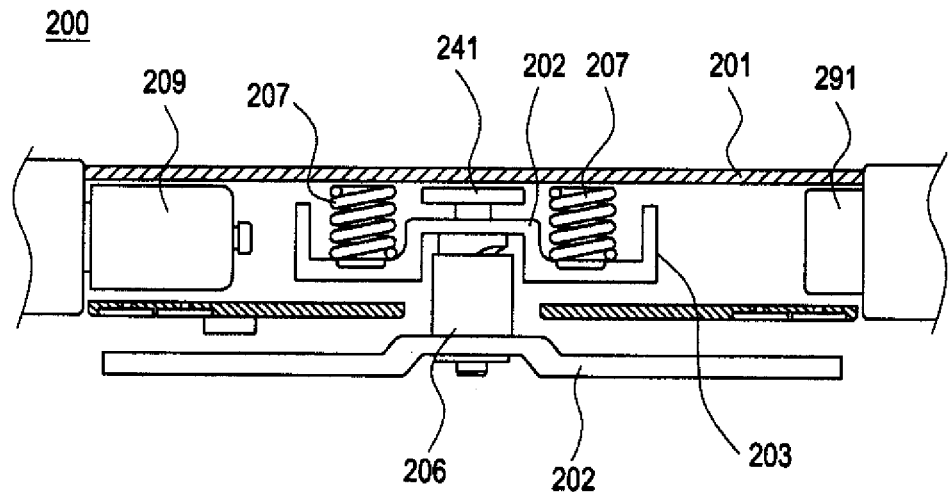
FIG. 11 is an internal structural view showing an assembled state of a hinge apparatus shown in FIG. 2.

As shown in FIG. 11, the elastic members 207 each are supported at an end thereof by an inner wall of the hinge housing 201 and at another end thereof by the cam member 203, more specifically, the support 235, and provides an elastic force working in a direction urging both ends of the elastic member 207 to be away from each other. Once the coupling member 202 and the cam member 203 are coupled to the hinge housing 201, the inclined surface 223 of the second male thread portion 221 faces the inclined surface 233b of the first male thread portion 233a. In this state, the elastic force of the elastic member 207 works in a direction urging the cam member 203 to closely contact the coupling member 202. Thus, the coupling member 202 rotates in a direction that a top dead center of the first male thread portion 233a moves to a bottom dead center of the second male thread portion 221 and a top dead center of the second male thread portion 221 moves to a bottom dead center of the first male thread portion 233a.

The portable terminal 100 may include a cam housing 206 (FIG. 2) for enclosing the first male thread portion 233a and the second male thread portion 221. A portion of a flexible printed circuit board 299 for interconnecting circuit devices of the first housing 101 and the second housing 102 is wired around the first male thread portion 233a and the second male thread portion 221. The cam housing 206 is in a cylindrical shape to enclose the first male thread portion 233a and the second male thread portion 221, such that the flexible printed circuit board 299 is prevented from being interfered by the first male thread portion 233a and the second male thread portion 221.

In the current exemplary embodiment, each of the first male thread portion 233a and the second male thread portion 221 includes one top dead center and one bottom dead center. When the top dead center of the first male thread portion 233a and the top dead center of the second male thread portion 221 face each other, the cam member 203 moves back to the furthest position from the coupling member 202 and an elastic force accumulated in the elastic members 207 goes to the maximum. Once the coupling member 202 rotates clockwise or counterclockwise, the elastic force of the elastic members 207 provide a drive force in a rotating direction of the coupling member 202.

The cover member 205 (FIG. 2) is provided preferably as a pair and is attached to the outer circumferential surface of the hinge housing 201. The cover member 205 closes the planar portion of the outer circumferential surface of the hinge housing 201 except for a space for allowing the first male thread portion 233a to be positioned in the inner side of the hinge housing 201. An interference protrusion 251 protrudes on the cover member 205, and also keeps protruding on the outer circumferential face of the hinge housing 201. Moreover, a pair of interference grooves 117 corresponding to the interference protrusion 251 are formed at both sides of the first male thread portion 233a on an outer side of a side end of the first housing 101.

During pivoting of the first housing 101 around the second hinge axis H2, the interference protrusion 251 may be positioned in the interference grooves 117. In this case, when the interference protrusion 251 is interfered by an inner wall of one of the interference grooves 117, the second housing 102 cannot pivot around the second hinge axis H2 anymore and is stopped. That is, as the interference protrusion 251 is interfered by the inner wall of the interference groove 117, the range of pivoting of the second housing 102 around the second hinge axis H2 is limited.

Even when the first housing 101 pivots around the second hinge axis H2, the user uses the portable terminal 100 in practice in a state where the first housing 101 is positioned in parallel with the hinge axis H1. Therefore, the first housing 101 of the portable terminal 100 according to an exemplary embodiment of the present invention is set to pivot around the second hinge axis H2 within a range of 180°, and such limitation of the rotating range is achieved by the interference protrusion 251 and the interference grooves 117.

Hereinafter, with reference to FIGS. 11 through 13, a description will be made of a wiring structure for the flexible printed circuit board 299 for connecting the circuit devices of the first housing 101 and the second housing 102.

Figure 12:
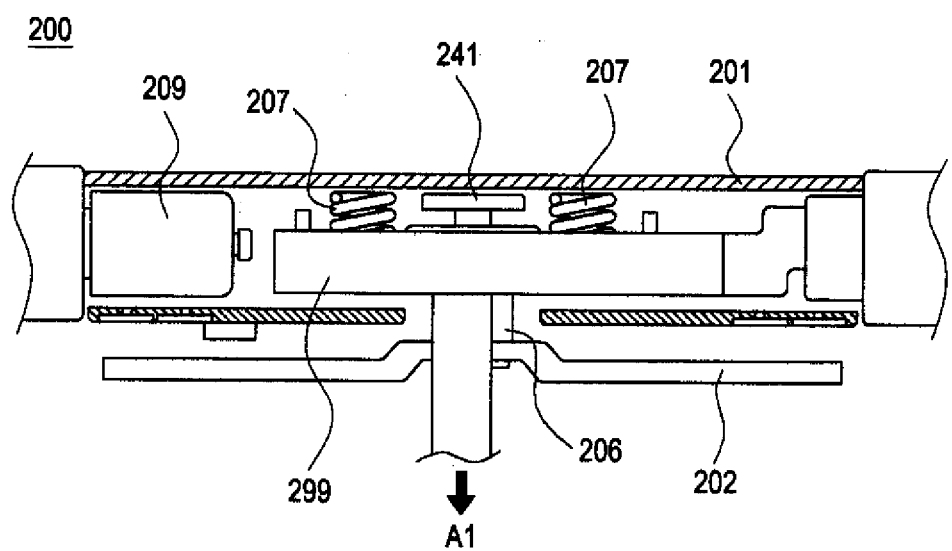
FIG. 12 is an internal structural view showing a state where a flexible printed circuit board is wired through a hinge apparatus shown in FIG. 11.
Figure 13:
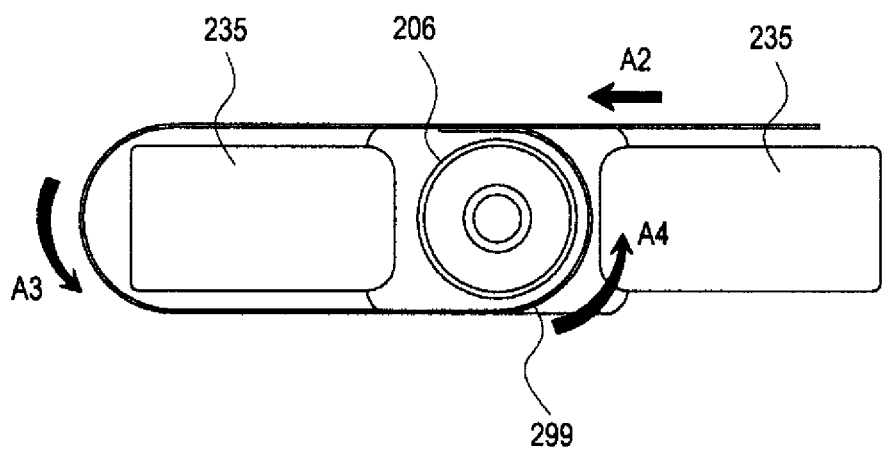
FIG. 13 is an internal plane view showing a state where a flexible printed circuit board is wired through a hinge apparatus shown in FIG. 11.

As shown in FIG. 12, the flexible printed circuit board 299 is inserted into the hinge housing 201 through the hinge dummy 291 (in a direction indicated by an arrow A2 shown in FIG. 13). In the hinge housing 201, the flexible printed circuit board 299 extends to enclose the support 235 at a side (in a direction indicated by an arrow A3) and then extends to enclose a portion of the first male thread portion 233a and the second male thread portion 221, more specifically, a portion of the cam housing 206 (in a direction indicated by an arrow A4). The flexible printed circuit board 299 is wired such that its extending portion for enclosing the first male thread portion 233a and the second male thread portion 221 goes at least 180°. This angular range is intended to prevent tension from working on the flexible printed circuit board 299 in spite of pivoting of the first housing 101 around the second hinge axis H2. The flexible printed circuit board 299, after extending to enclose the first male thread portion 233a and the second male thread portion 221, extends along the second hinge axis H2 (in a direction indicated by an arrow A1 shown in FIG. 12), thus being inserted into the first housing 101.

While the flexible printed circuit board 299 extends to enclose one of the supports 235 of the cam member 203 in the current exemplary embodiment, the flexible printed circuit board 299 may also be wired such that its extending portion encloses the first male thread portion 233a and the second male thread portion 221 by going over 360°. In other words, the flexible printed circuit board 299 is wired such that it does not extend to enclose the support 235, but rather, its extending portion along the direction A3 directly faces the first male thread portion 233a and the second male thread portion 221 or the outer circumferential surface of the cam housing 206. Such a structure may be properly selected by those of ordinary skill in the art in consideration of a margin length of the flexible printed circuit board 299 required for pivoting of the first housing 101 in actual product manufacturing.

FIG. 14 shows a state where the second housing 102 is opened by pivoting around the first hinge axis H1, and FIG. 15 shows a state where front and rear surfaces of the first housing 101 are reversed. As shown in FIG. 15, when a display device 121b installed on the second surface of the second housing 102 is positioned in the same direction as the keypad 111 of the first housing 101 after opening of the portable terminal 100, upon pivoting of the second housing 102 around the first hinge axis H1, the second housing 102 in which the display device 121b is exposed may be folded to the first housing 101. Generally, when the first housing 101 and the second housing 120 are folded together, the keypad 111 is closed. However, if the first housing 101 and the second housing 102 are folded together again from the state shown in FIG. 15, they may be folded while the keypad 111 is exposed to outside.

Since the display device 121b is installed on the second surface of the second housing 102 which is not related to the structure of the hinge apparatus 200 for coupling the first housing 101 and the second housing 102, the display device 121b may be installed to a size which approximates to the entire area of the second surface of the second housing 102. In other words, the portable terminal 100 may use a display device installation area that is permitted by the second housing 102, purely for display device installation.

Figure 16:
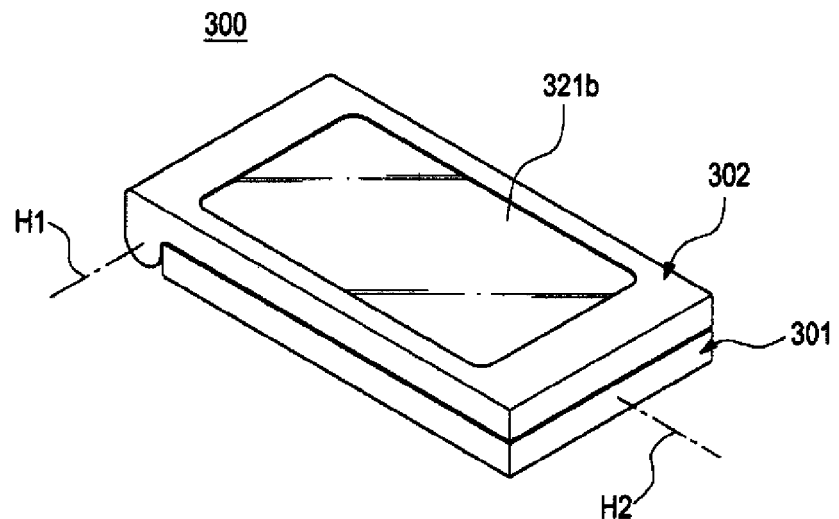
FIG. 16 is a perspective view of a portable terminal according to another embodiment of the present invention.
Figure 18:
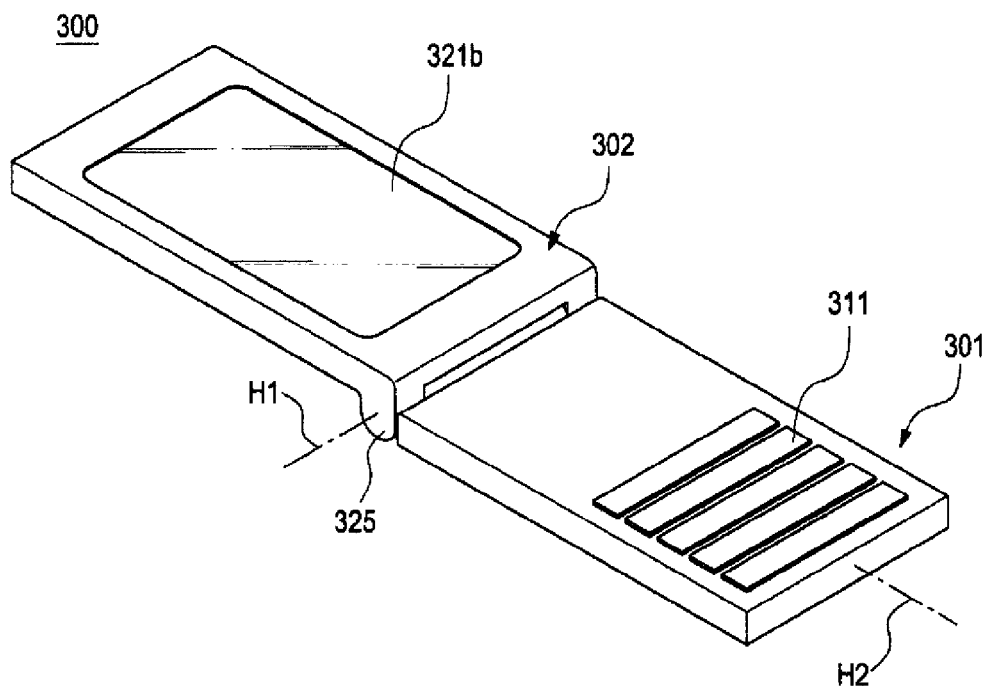
FIG. 18 is a perspective view showing a state where a first housing of a portable terminal shown in FIG. 17 pivots around a second hinge axis such that front and rear surfaces of the first housing are reversed.
Figure 19:
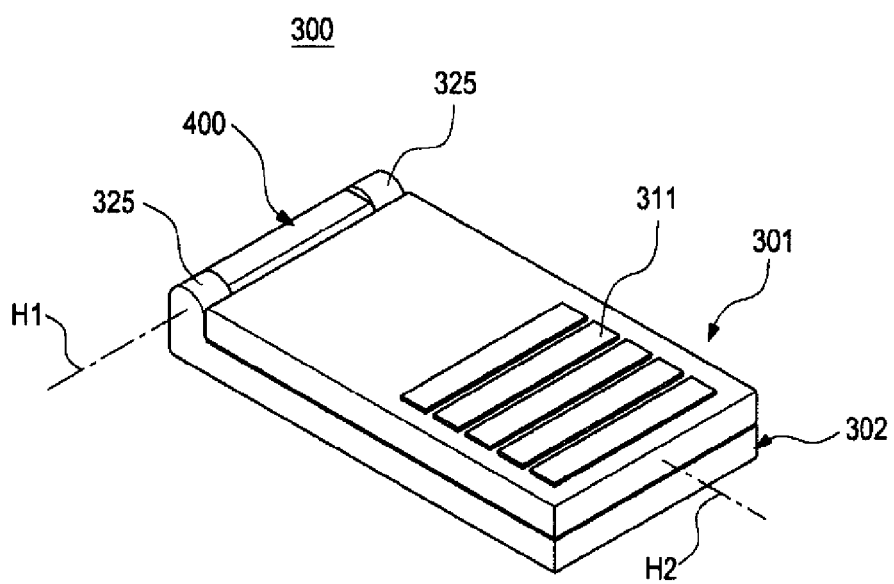
FIG. 19 is a perspective view showing a state where a second housing of a portable terminal shown in FIG. 18 is folded onto a first housing by pivoting around a first hinge axis.
Figure 20:
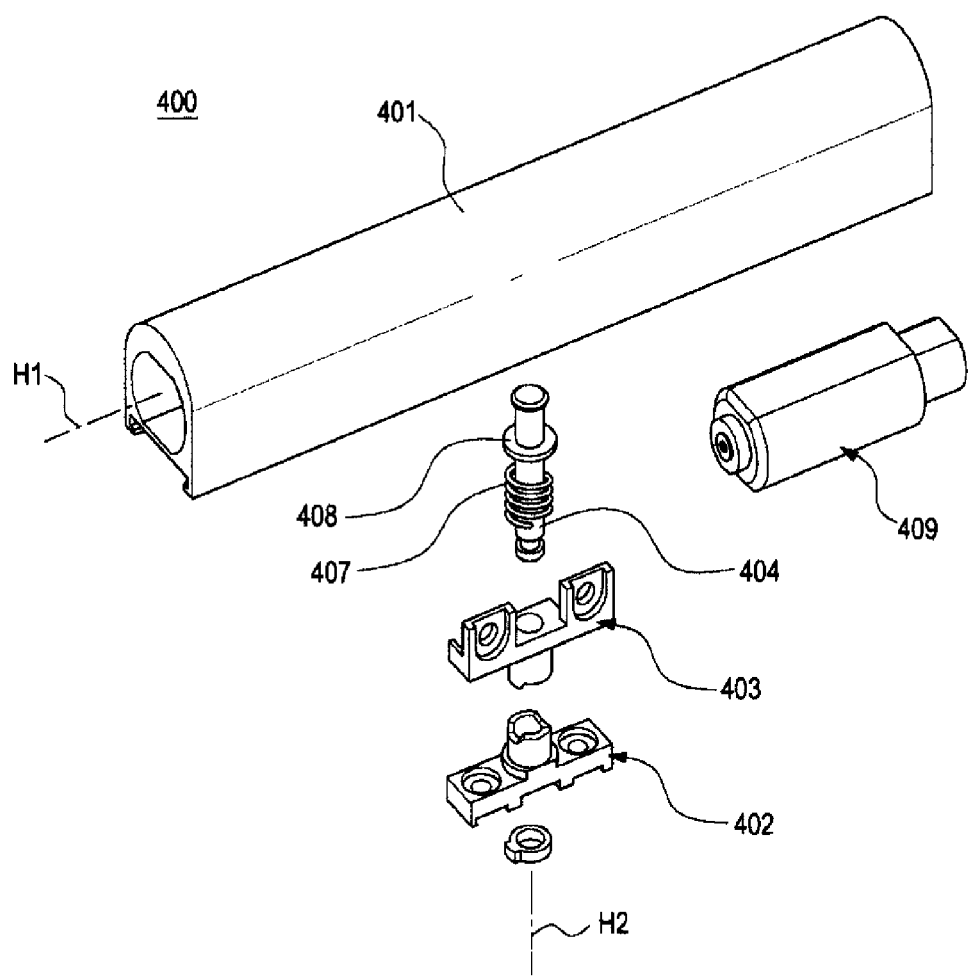
FIG. 20 is a perspective view of a hinge apparatus of a portable terminal shown in FIG. 16.

FIGS. 16 through 19 are perspective views showing a portable terminal 300 according to another exemplary embodiment of the present invention, and FIG. 20 is an exploded perspective view showing a hinge apparatus 400 for coupling housings 301 and 302 of the portable terminal 300 shown in FIG. 16. The portable terminal 100 according to the previous exemplary embodiment is structured to easily implement an operation for positioning the display devices 121a and 121b long in a widthwise direction when the housings 101 and 102 are unfolded; whereas the portable terminal 300 according to the current embodiment is structured to easily implement an opening operation for positioning display devices 321a and 321b long in a longitudinal direction.

Figure 17:
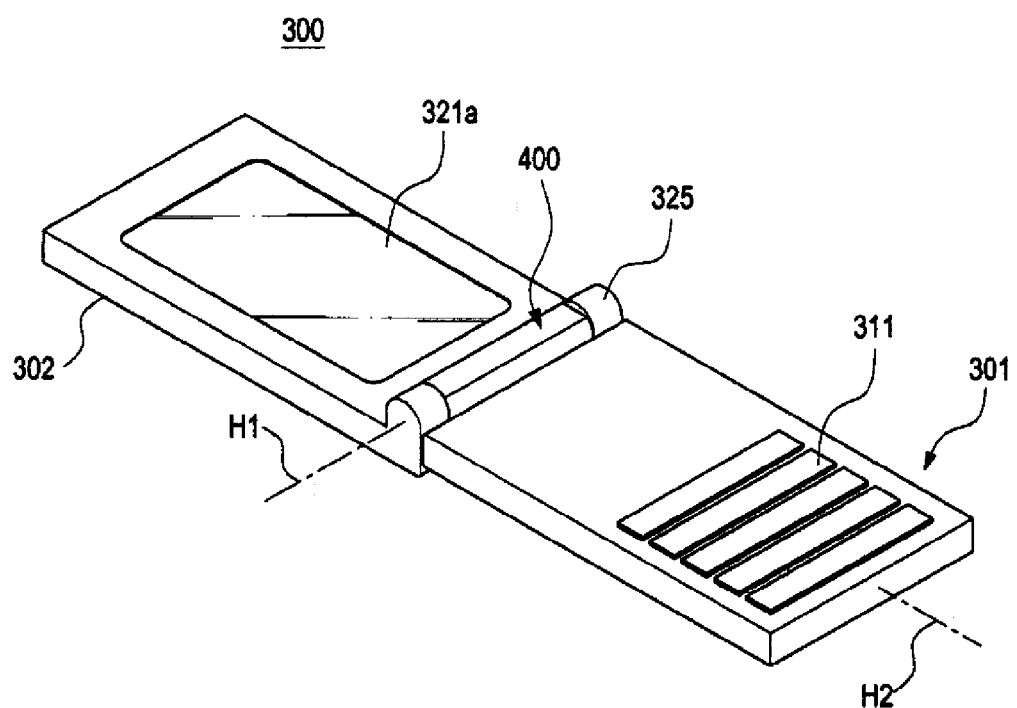
FIG. 17 is a perspective view showing a state where a second housing of a portable terminal shown in FIG. 16 is opened by pivoting around a first hinge axis.

As shown in FIGS. 17 and 18, the first housing 301 and the second housing 302 pivot in a direction toward or away from each other while facing each other, thus opening or closing the portable terminal 300. In an opened state of the portable terminal 300, front and rear surfaces of the first housing 301 may be reversed.

The first housing 301 preferably includes a keypad 311 on a first surface thereof and a battery pack (not shown) on a second surface thereof. The keypad 311 is generally positioned in a direction facing the second housing 302 to be opened or closed by the second housing 302, but when the front and rear surfaces of the first housing 301 are reversed as shown in FIGS. 18 and 19, the keypad 311 may be open at all times regardless of whether the first housing 301 and the second housing 302 are folded together or not.

Referring now to FIG. 17, on the first surface of the second housing 302 may be formed a pair of side hinge arms 325 in positions spaced apart from each other and a first display device 321a. In terms of a structure shown in FIG. 17, the portable terminal 300 is substantially the same as a general folder-type portable terminal. On a second surface of the second housing 302 opposite to a first surface of the second housing 302 is formed a second display device 321b which may be formed larger than the first display device 321a because any structure is not formed on the second surface of the second housing 302 and thus only the second display device 321b can be installed on the second surface of the second housing 302.

Hereinafter, with reference to FIG. 20, a description will be made of a hinge apparatus 400 for coupling the first housing 301 and the second housing 302 of the portable terminal 300. The hinge apparatus 400 includes a hinge housing 401 and a coupling member 402. The hinge housing 401 is coupled between the side hinge arms 325 to pivot around the first hinge axis H1. The coupling member 402 is fixed to the first housing 301 and coupled to the hinge housing 401 to pivot around the second hinge axis H2. The second housing 302 moves toward or away from the first housing 301 by pivoting around the first hinge axis H1. In this state, a hinge module 409 is received in the hinge housing 401 to provide a drive force for urging the second housing 302 to pivot in a direction toward or away from the first housing 301. When the second housing 302 pivots in the direction away from the first housing 301, the first housing 301 may pivot around the second hinge axis H2 such that the front and rear surfaces of the first housing 301 may be reversed.

To bind the coupling member 402 to the hinge housing 401, the hinge apparatus 400 includes a coupling shaft 404. The coupling shaft 404 extends along the second hinge axis H2, and is fixed to the hinge housing 401 through the coupling member 402. A cam member 403 and an elastic member 407 are received in the hinge housing 401, such that the coupling shaft 404 is installed to pass through the cam member 403 and the elastic member 407 is disposed to surround an outer circumferential surface of the cam member 403. The elastic member 407 provides an elastic force working in a direction urging the cam member 403 to closely contact the coupling member 402.

The cam member 403 and the coupling member 402 may include protrusions and grooves which are circumferentially formed by turns on facing surfaces of the cam member 403 and the coupling member 402. During pivoting of the first housing 301 around the second hinge axis H2, the protrusion (or groove) formed in the cam member 403 is engaged with the groove (or protrusion) formed in the coupling member 402, thus temporarily stopping pivoting of the first housing 301. Preferably, the protrusion and the groove formed in the cam member 403 and the coupling member 402 are engaged with each other, such that the first housing 301 can stably maintain its stop position as shown in FIG. 17 or 18. The protrusions and the grooves may be formed by forming top end portions of the male thread portions 221 and 233a, formed in the coupling member 202 and the cam member 203 according to the previous exemplary embodiment, to have planar surfaces.

An end of the elastic member 407 is supported by an inner wall of the hinge housing 401 and another end thereof is supported by the cam member 403. Preferably, a washer is installed in an end portion of at least a portion of the elastic member 407, more specifically, in both end portions of the elastic member 407, to prevent friction between the elastic member 407 and other structures.

The above-described structure of the hinge apparatus 400 can be more easily understood by the hinge apparatus 200 according to the previous embodiment, and it would be easily understood by those of ordinary skill in the art that the structure of the hinge apparatus 400 may be substituted by the hinge apparatus 200 according to the previous exemplary embodiment or may be applied to the portable terminal 100 according to the previous exemplary embodiment.

As can be anticipated from the foregoing description, in the portable terminal according to the present invention, a display device installed on a second surface of a second housing is preferably implemented with a full-touch screen, thus allowing a user to conveniently use a multimedia function even when a first housing and a second housing are folded together. Moreover, the display device is installed on a surface which is not interfered by a hinge apparatus for coupling the first housing and the second housing and by side hinge arms, such that an area for the display device can be maximized within a limited space of the portable terminal. Furthermore, by pivoting the first housing around a second hinge axis, a keypad can be positioned in parallel with the display device installed on the second surface of the second housing, thereby allowing the user to create a document or enjoy a game on a large screen while manipulating the keypad.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A hinge apparatus enabling two-axis rotation of a first housing and second housing of a portable terminal, comprising:
    a pair of side hinge arms extending from the first housing of the portable terminal;
    a hinge housing coupled between the pair of side hinge arms to enable rotation around a first hinge axis;
    a coupling shaft fixed to the hinge housing, the coupling shaft extending along a second hinge axis perpendicular to the first hinge axis;
    a coupling member coupled to the second housing of the portable terminal, and further coupled to the coupling shaft to enable rotation around the second hinge axis; and
    a cam member disposed at least partially within the hinge housing moveable on the coupling shaft along the second hinge axis,
    wherein rotation of the portable terminal along the first hinge axis causes the first housing and second housing to transition from a folded state to an open state, and rotation of the portable terminal along the second hinge axis causes a pivot such that a first surface and second surface of the second housing is reversed relative to the first housing.

2. The hinge apparatus of claim 1, wherein the portable terminal further comprises at least two display devices in which one of the two display devices is installed on the first surface of the first housing.

3. The hinge apparatus of claim 2, wherein the portable terminal further comprises a keypad installed on the first surface or the second surface of the second housing.

4. The hinge apparatus of claim 3, wherein when the first surface and the second surface of the second housing are reversed in unfolded states of the first housing and the second housing, the keypad is selectively positioned in parallel with one of the at least two display devices.

5. The hinge apparatus of claim 1, further comprising a hinge module disposed at least partially within the hinge housing and engaged with at least one of the pair of side hinge arms, the hinge module providing a driving force actuating the first housing to move toward or away from the second housing.

6. The hinge apparatus of claim 1, further comprising:
    at least one biasing member disposed at least partially within the hinge housing to provide a bias force driving the cam member towards the coupling member to provide mechanical actuation of the rotation of the portable terminal along the second hinge axis.

7. The hinge apparatus of claim 6, wherein the coupling shaft sequentially penetrates through the cam member and the coupling member, and an engaging member is fixed to an terminal end of the coupling shaft, securing the cam member and the coupling member on the coupling shaft.

8. The hinge apparatus of claim 6, further comprising two of the at least one biasing members, which are disposed on both sides of the coupling shaft and aligned along axes parallel to the second hinge axis.

9. The hinge apparatus of claim 6, wherein the at least one biasing member is disposed so as to circumferentially encircle at least a portion of the coupling shaft along the second hinge axis.

10. The hinge apparatus of claim 6, wherein the hinge apparatus comprises:
    a first male thread portion formed on the cam member and including a first inclined surface; and
    a second male thread portion formed on a surface of the coupling member and including a second inclined surface,
    wherein the first inclined surface and the second inclined surface are tensioned against one another via the at least on biasing member to provide mechanical actuation for rotation of the portable terminal along the second hinge axis.

11. The hinge apparatus of claim 10, wherein a top end portion of the first male thread portion and a top end portion of the second male thread portion are planar.

12. A portable terminal, comprising:
    a first housing and a second housing foldably hinge-coupled to the first housing; and
    a hinge apparatus including:
        a pair of side hinge arms extending from the first housing of the portable terminal;
        a hinge housing coupled between the pair of side hinge arms to enable rotation around a first hinge axis;
        a coupling shaft fixed to the hinge housing, the coupling shaft extending along a second hinge axis perpendicular to the first hinge axis;
        a coupling member coupled to the second housing of the portable terminal, and further coupled to the coupling shaft to enable rotation around the second hinge axis; and
        a cam member disposed at least partially within the hinge housing moveable on the coupling shaft along the second hinge axis,
    wherein rotation of the portable terminal along the first hinge axis causes the first housing and second housing to transition from a folded state to an open state, and rotation of the portable terminal along the second hinge axis causes a pivot such that a front surface and rear surface of the second housing is reversed relative to the first housing.

13. The portable terminal of claim 12, further comprising a keypad installed on at least one of a front surface and a rear surface of the first housing, wherein when the portable terminal is in the folded state, the keypad is hidden by being disposed against the front surface of the second housing.

14. The portable terminal of claim 13, wherein when the front surface and the rear surface of the second housing is reversed relative to the first housing, the keypad is exposed when the portable terminal is in the folded state.

15. The portable terminal of claim 12, further comprising a keypad installed on at least one of a front surface and a rear surface of the first housing, wherein when the first housing and the second housing are unfolded, the keypad is positioned in parallel with a display device disposed on at least one of the front surface or rear surface of the second housing.

16. The portable terminal of claim 13, wherein the keypad is a qwerty-arrangement keyboard.

17. The portable terminal of claim 12, further comprising at least two display devices in which a second display device of the at least two display devices is disposed on the front surface of the second housing.

18. The portable terminal of claim 12, the hinge apparatus further comprising:
- at least one biasing member disposed at least partially within the hinge housing to provide a bias force driving the cam member towards the coupling member to provide mechanical actuation of the rotation of the portable terminal along the second hinge axis.

19. The portable terminal of claim 18, wherein the biasing member is disposed along an axis parallel to the second hinge axis.

20. The portable terminal of claim 18, wherein the hinge apparatus comprises:
- a first male thread portion formed on the cam member and including a first inclined surface; and
- a second male thread portion formed on a surface of the coupling member and including a second inclined surface,
- wherein the first inclined surface and the second inclined surface are tensioned against one another via the at least on biasing member to provide mechanical actuation for rotation of the portable terminal along the second hinge axis.

* * * * *

UNITED STATES PATENT AND TRADEMARK OFFICE
CERTIFICATE OF CORRECTION

| | | |
|---|---|---|
| PATENT NO. | : 8,996,079 B2 | Page 1 of 1 |
| APPLICATION NO. | : 13/051100 | |
| DATED | : March 31, 2015 | |
| INVENTOR(S) | : Sung-Ho Ahn | |

It is certified that error appears in the above-identified patent and that said Letters Patent is hereby corrected as shown below:

In the claims,

Column 11, Claim 7, Lines 65-66 should read as follows:
--...fixed to a terminal...--

Column 12, Claim 10, Line 18 should read as follows:
--...one biasing member to...--

Column 13, Claim 20, Line 24 should read as follows:
--...one biasing member to...--

Signed and Sealed this
Twenty-first Day of July, 2015

Michelle K. Lee
*Director of the United States Patent and Trademark Office*